United States Patent [19]

Chua

[11] Patent Number: 5,638,044
[45] Date of Patent: Jun. 10, 1997

[54] APPARATUS AND METHOD FOR PREVENTING CAR-JACKING

[76] Inventor: Jaime S. Chua, 18659 Glenlyn Dr., Azusta, Calif. 91702

[21] Appl. No.: 614,675

[22] Filed: Mar. 13, 1996

[51] Int. Cl.⁶ .................................................. B60R 25/10
[52] U.S. Cl. ........................... 340/426; 340/429; 340/430; 180/287; 307/10.2; 307/10.3
[58] Field of Search ........................... 340/426, 430, 340/539, 429, 425.5; 307/10.2, 10.3, 10.4; 180/287

[56] References Cited

U.S. PATENT DOCUMENTS

| | | | |
|---|---|---|---|
| 4,940,964 | 7/1990 | Dao | 340/438 |
| 5,049,867 | 9/1991 | Stouffer | 340/426 |
| 5,132,551 | 7/1992 | Carlo et al. | 307/10.3 |
| 5,276,728 | 1/1994 | Pagliaroli | 340/426 |
| 5,298,878 | 3/1994 | Smith | 340/430 |
| 5,349,329 | 9/1994 | Smith | 340/539 |
| 5,408,211 | 4/1995 | Hall | 340/425.5 |
| 5,412,370 | 5/1995 | Berman et al. | 340/430 |
| 5,513,244 | 4/1996 | Joao et al. | 340/539 |
| 5,515,419 | 5/1996 | Sheffer | 340/539 |

*Primary Examiner*—Thomas Mullen
*Assistant Examiner*—Davetta C. Woods

[57] ABSTRACT

An apparatus and method for preventing car-jacking including a receiver situated within a vehicle and adapted to allow the receipt of the activation signal and deactivation signal from an off site transmitting source similar to that employed in the art of pagers. Also included is a control mechanism electrically connected to an existing alarm, ignition coil of a vehicle, and the receiver. The control mechanism is adapted to activate the alarm and deactivate the ignition coil after a predetermined amount of time upon the receipt of the activation signal by the receiver. The control mechanism is also adapted to deactivate the alarm and activate the ignition coil upon the receipt of the deactivation signal.

1 Claim, 2 Drawing Sheets

APPARATUS AND METHOD FOR PREVENTING CAR-JACKING

BACKGROUND OF THE INVENTION

1. Field of the Invention

The present invention relates to an apparatus and method for preventing car-jacking and more particularly pertains to preventing injury to a driver of a car-jacked vehicle and further precluding the successful theft of the vehicle.

2. Description of the Prior Art

The use of theft prevention devices is known in the prior art. More specifically, theft prevention devices heretofore devised and utilized for the purpose of preventing the theft of a vehicle are known to consist basically of familiar, expected and obvious structural configurations, notwithstanding the myriad of designs encompassed by the crowded prior art which have been developed for the fulfillment of countless objectives and requirements.

By way of example, the prior art discloses in U.S. Pat. No. 4,808,981 to Seibold an automotive electronic communication apparatus with theft disabling audio equipment. U.S. Pat. No. 5,349,329 to Smith discloses an anti-theft apparatus to prevent car jacking including a transmitter carried by the driver and a receiver and a switch circuit installed on the vehicle such that when the receiver fails to detect the signal broadcasted by the transmitter, the switch circuit disables the vehicle for operation. U.S. Pat. No. 5,335,748 to Wilson discloses an anti-theft apparatus. Lastly, U.S. Des. Pat. No. 270,830 to Jacobs; U.S. Pat. No. 5,179,868 to Thibeault; and U.S. Pat. No. 5,311,756 to Villani are provided as being of general interest.

In this respect, the apparatus and method for preventing car-jacking according to the present invention substantially departs from the conventional concepts and designs of the prior art, and in so doing provides an apparatus primarily developed for the purpose of preventing injury to a driver of a car-jacked vehicle and further precluding the successful theft of the vehicle.

Therefore, it can be appreciated that there exists a continuing need for a new and improved apparatus and method for preventing injury to a driver of a car-jacked vehicle and further precluding the successful theft of the vehicle. In this regard, the present invention substantially fulfills this need.

SUMMARY OF THE INVENTION

In view of the foregoing disadvantages inherent in the known types of theft prevention devices now present in the prior art, the present invention provides an improved apparatus and method for preventing car-jacking. As such, the general purpose of the present invention, which will be described subsequently in greater detail, is to provide a new and improved apparatus and method for preventing car-jacking apparatus and method which has all the advantages of the prior art and none of the disadvantages.

To attain this, the present invention essentially comprises a receiver housing with a generally rectangular configuration and an interior space formed therein. For allowing the securement thereof in a discrete location within a vehicle, the receiver housing has a pair of eyelets formed on opposite sides thereof. A receiver is situated within the receiver housing and is adapted to allow the receipt of an activation signal and a deactivation signal. Finally, a control mechanism is situated within the receiver housing for governing the operation of the present invention. The control mechanism is electrically connected to an existing alarm, an ignition coil of the vehicle, and the receiver. In use, upon the receipt of the activation signal by the receiver, the control mechanism is adapted to disable the ignition coil and activate the alarm after a predetermined amount of time. The control mechanism is further adapted to actuate the ignition coil and deactivate the alarm upon the receipt of the deactivation signal. The method associated with the apparatus of the present invention will be described hereinafter.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved apparatus and method for preventing car-jacking which has all the advantages of the prior art theft prevention devices and none of the disadvantages.

It is another object of the present invention to provide a new and improved apparatus and method for preventing car-jacking which may be easily and efficiently manufactured and marketed.

It is a further object of the present invention to provide a new and improved apparatus and method for preventing car-jacking which is of a durable and reliable construction.

An even further object of the present invention is to provide a new and improved apparatus and method for preventing car-jacking which is susceptible of a low cost of manufacture with regard to both materials and labor, and which accordingly is then susceptible of low prices of sale to the consuming public, thereby making such apparatus and method for preventing car-jacking economically available to the buying public.

Still yet another object of the present invention is to provide a new and improved apparatus and method for preventing car-jacking which provides in the apparatuses and methods of the prior art some of the advantages thereof, while simultaneously overcoming some of the disadvantages normally associated therewith.

Still another object of the present invention is to prevent injury to a driver of a stolen vehicle and further preclude the successful theft thereof.

Lastly, it is an object of the present invention to provide a new and improved apparatus and method for preventing car-jacking including a receiver situated within a vehicle and adapted to allow the receipt of the activation signal and deactivation signal from an off site transmitting source similar to that employed in the art of pagers. Also included is a control mechanism electrically connected to an existing alarm, ignition coil of a vehicle, and the receiver. The control mechanism is adapted to activate the alarm and deactivate the ignition coil after a predetermined amount of time upon the receipt of the activation signal by the receiver. The control mechanism is also adapted to deactivate the alarm and activate the ignition coil upon the receipt of the deactivation signal.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
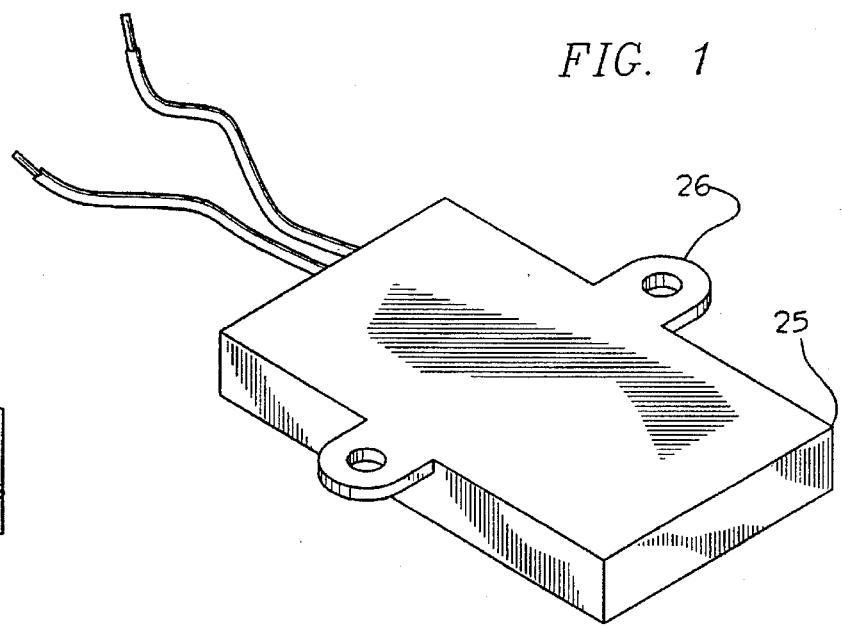
FIG. 1 is a perspective illustration of the preferred embodiment of the apparatus for preventing car-jacking constructed in accordance with the principles of the present invention.
Figure 2:
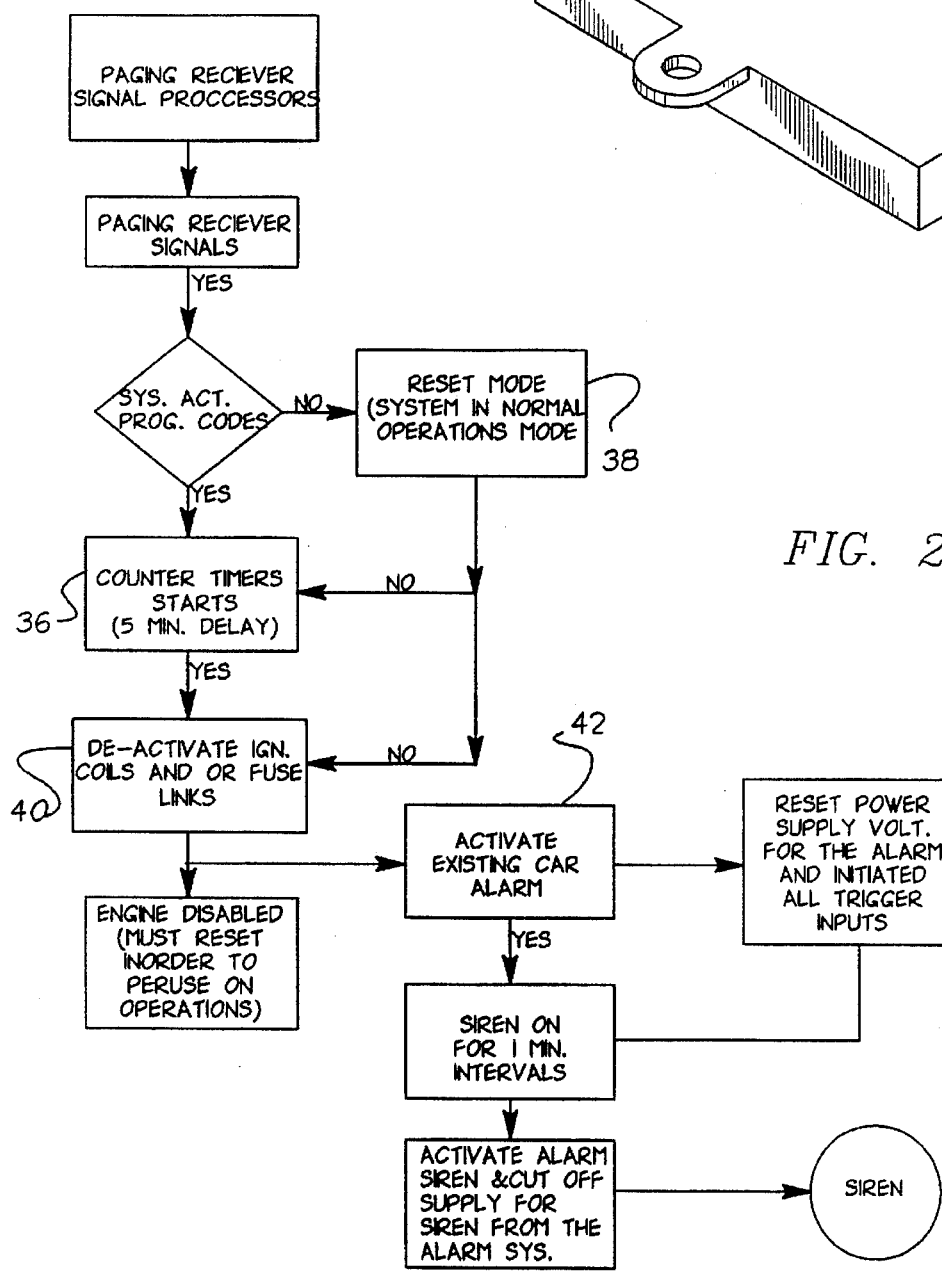
FIG. 2 is a flow chart depicting the method of the present invention.
Figure 3:
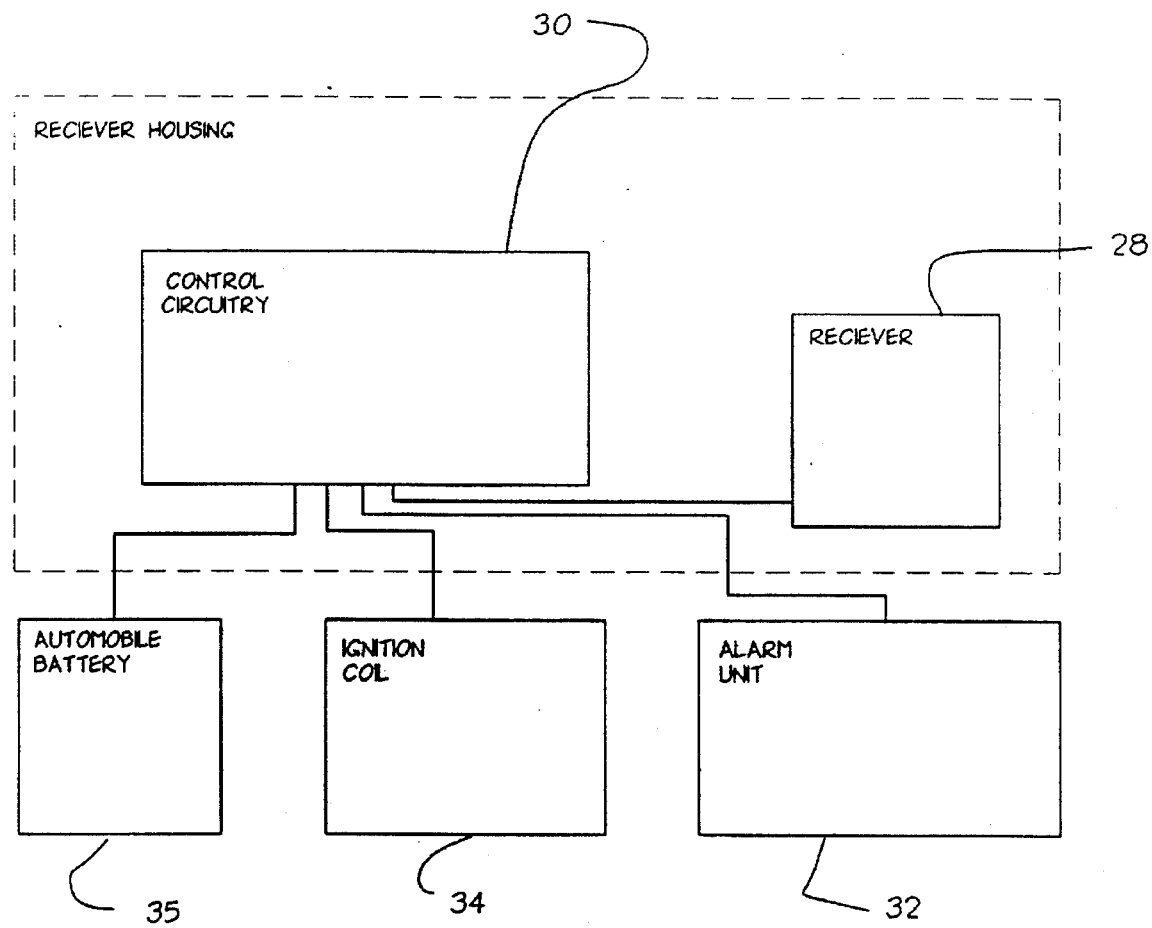
FIG. 3 is a schematic of the circuitry employed in the transmitter and receiver of the present invention.

With reference now to the drawings, and in particular to FIG. 1 thereof, a new and improved apparatus and method for preventing car-jacking embodying the principles and concepts of the present invention and generally designated by the reference numeral 10 will be described.

The present invention, the new and improved apparatus and method for preventing car-jacking, is comprised of a plurality of components. Such components in their broadest context include a receiver housing, receiver, and control mechanism. Such components are individually configured and correlated with respect to each other so as to attain the desired objective.

More specifically, it will be noted that the system 10 of the present invention includes a receiver housing 25 with a generally rectangular configuration and an interior space formed therein. For allowing the securement thereof in a discrete location within a vehicle, the receiver housing has a pair of eyelets 26 formed on opposite sides thereof. Conventional screws may be employed to mount the receiver housing. The size of the receiver housing is suitably designed insofar as it may be fixed under a conventional dash of the automobile.

A receiver 28 is situated within the receiver housing and is adapted to allow the receipt of an activation signal and deactivation signal. Such activation signal and deactivation signal comprise of signals transmitted from a paging company upon the dialing of a first number and a second number, respectively. Upon the transmission of the activation signal, the receiver is adapted to immediately emit an audio signal to indicate to the user that the activation signal has been received via a page. As an option, a reset key may be included and positioned discreetly within the vehicle. Such reset key is connected to the receiver and is adapted to transmit a deactivation signal thereto upon the depression thereof thus providing a second method of deactivating the present invention.

Also included is a control mechanism comprising control circuitry 30 situated within the receiver housing for governing the operation of the present invention. The control mechanism is electrically connected to an existing alarm 32, an ignition coil 34 of the vehicle, and the receiver. In use, upon the receipt of the activation signal by the receiver, the control mechanism is adapted to activate the alarm intermittently in one minute intervals and disable the ignition coil after a predetermined amount of time. Ideally, the amount of time before the security measures actuate is approximately 2-3 minutes thus allowing the thief to depart from the vicinity of the victim and also allowing the user to deactivate the system if the audio signal of the receiver sounds indicating the inadvertent receipt of the activation signal. Alternatively, the control mechanism may manipulate fuse links of the vehicle in lieu of the ignition coil to effect similar results. The control mechanism is further adapted to actuate the ignition coil and deactivate the alarm upon the receipt of the deactivation signal. Ideally, both the activation signal and deactivation signal are encoded. The control mechanism is adapted to effect the decoding of the activation and deactivation signal after the receipt thereof. Such encoding and decoding of both signals prevent the inadvertent initiation of the security measures resulting from stray signals similar to those employed in the present invention.

As shown in FIG. 4, the method associated with the present invention will now be described. First, as shown in block 36, the device activates a countdown timer upon the receipt of an activation signal by a receiver situated within the vehicle. The activation signal is transmitted from a remote location with respect to the vehicle. During the countdown, in block 38, the device may deactivate the countdown timer upon the depression of the reset key or further the receipt of a deactivation signal by the receiver via a page. After the cessation of the countdown, the device disables the ignition coil and actuates the alarm as shown in block 40 & 42, respectively. The ignition coil may be activated and the alarm may be deactivated at any time upon the receipt of the deactivation signal.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved apparatus for preventing carjacking comprising, in combination:

a receiver housing with a generally rectangular configuration and an interior space formed therein, the receiver housing having a pair of eyelets formed on opposite sides thereof for allowing the securement thereof in a discrete location within a vehicle with conventional screws;

a receiver situated within the receiver housing and adapted to allow the receipt of an activation signal and a deactivation signal, wherein the signals are those used in the art of pagers and are generated by the dialing of a first number and a second number, respectively, whereby upon the receipt of the activation signal, the receiver is adapted to immediately emit an audio signal to indicate that the activation signal has been received;

a reset key positioned discreetly within the vehicle, the reset key adapted to transmit a deactivation signal to the receiver upon the depression thereof; and control means situated within the receiver housing and electrically connected to an existing alarm, an ignition coil of the vehicle, and the receiver, the control means adapted to disable the ignition coil and activate the alarm intermittently in one minute intervals after a predetermined amount of time afforded by the activation of an associated countdown timer upon the receipt of the activation signal by the receiver and further adapted to deactivate the countdown timer, actuate the ignition coil and deactivate the alarm upon the receipt of the deactivation signal.

* * * * *